Sept. 23, 1969     U. C. LINTON     3,469,217
PROTECTOR FOR ELECTRICAL CIRCUITS
Filed Nov. 15, 1966
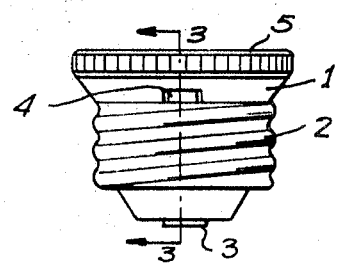
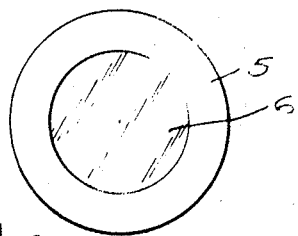
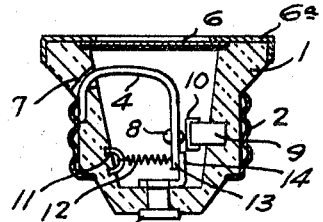
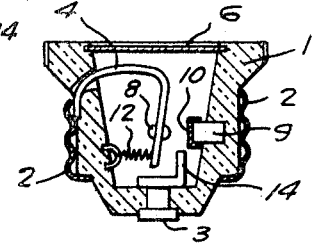
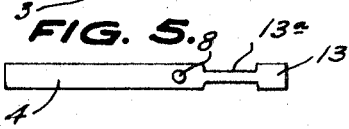
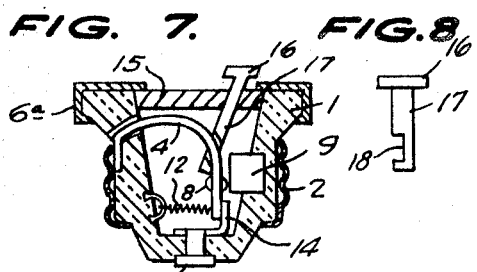
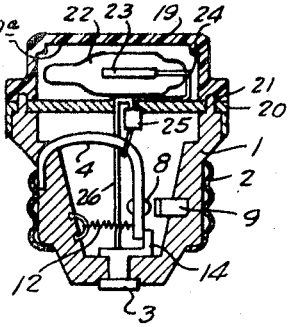
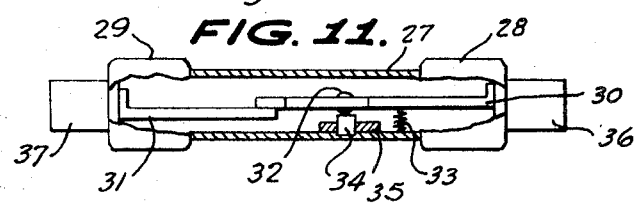
INVENTOR
ULLE C. LINTON,
BY *Linton and Linton*
ATTORNEYS United States Patent Office 3,469,217
Patented Sept. 23, 1969

3,469,217
PROTECTOR FOR ELECTRICAL CIRCUITS
Ulle C. Linton, 11300 Farmland Drive,
Rockville, Md. 20852
Filed Nov. 15, 1966, Ser. No. 594,469
Int. Cl. H01h 37/58
U.S. Cl. 335—208                                    6 Claims

ABSTRACT OF THE DISCLOSURE

The present protector for electrical circuits is capable of being interconnected in an electrical circuit for breaking said circuit when an overload occurs therein and has a pair of current conducting links for the passage of such current, which links are normally held in contact by one link or a part thereof being of a magnetically attracted material and being drawn to a magnet or having a magnet drawn to a magnetically attracted element whereby when said current overload occurs the magnetic permeability of the magnetically attracted material or magnet is diminished allowing said links to move apart breaking contact and thus, breaking said current, through resilient means attached to or the resiliency of one of said links.

---

The present invention is concerned with electrical circuit breakers.

The principal object of the present invention is to provide circuit breakers for electrical circuits which circuit breakers include a magnet and magnetically attracted links adjacent said magnet which will automatically interrupt said electrical circuit when said circuit breaker is interconnected therein and an overload occurs in said electrical circuit such as to heat said link to diminish its magnetic attraction to said magnet and which circuit breakers will automatically or can be manually reset to close said electrical circuit when said overload is discontinued.

Another and important object of the present invention is to provide circuit breakers whose only movable parts are elements which flex in the operation of the circuit breaker resulting in an unlimited life for the circuit breaker, one in which rust, dust and the like will not interfere with the operation of the circuit breaker and in which the elements can be housed in relatively small housings.

A still further important object of the invention is to provide circuit breakers for electrical circuits which will indicate when said circuit breakers are in their circuit breaking condition, are economical to produce and can include a fusible element as a safety feature.

Further objects of the invention will be in part obvious and in part pointed out from the detailed description of the accompanying drawings in which:

FIG. 1 is a side elevation of a plug type circuit breaker according to the present invention.

FIG. 2 is a top view of said plug type circuit breaker.

FIG. 3 is a cross-sectional view taken on line 3—3 of FIG. 1 with the circuit breaker in its circuit closing condition.

FIG. 4 is a cross-sectional view similar to FIG. 3, but with the circuit breaker in its circuit interrupting condition.

FIG. 5 is a top view of a modified form of link for the present circuit breakers.

FIG. 6 is a side elevation of said modified form of link for the present circuit breaker.

FIG. 7 is a cross-sectional view of a further modified form of the present circuit breakers.

FIG. 8 is a side view of a manual reset rod forming part of the fuseholder of FIG. 7.

FIG. 9 is a cross-sectional view of a third form of the present invention being an indicating circuit breaker.

FIG. 10 is a cross-sectional view similar to FIG. 3, but of a fourth form of the present circuit breaker.

And FIG. 11 is a side elevation partly broken away of a cartridge type circuit breaker according to the present invention.

Referring now more particularly to the accompanying drawings wherein like and corresponding parts are indicated by similar reference characters numeral 1 indicates a plug type base similar to either an Edison base or S-type base as used for electrical fuses and which base is formed of an electrical insulating material such as porcelain or an insulating plastic such as one of the thermo-setting plastic compositions, for example, a glass fiber alkyd or a diallyl phthalate insulating material. A screw shell 2 has said body inserted therein and is of a current conducting material such as brass for providing one terminal of the circuit breaker.

A metal rivet 3 also of brass or copper, for example, extends through the base of the body 1 and provides a second terminal of the circuit breaker. A link 4 of an electrical current conducting material such as copper, brass, iron, steel, zinc, beryllium copper or other alloy extends at one end through body opening 7 to and between said body and the screw shell 2 frictionally engaging said screw shell for retaining the same on said body or may be soldered thereto to insure good contact between said link and said screw shell.

Body 1 has an open top 5, in which is positioned a transparent mica disc 6 retained therein by a cap 6a spun onto said body.

Link 4 should preferably be of a flexible or resilient material, be current conducting and also of a magnetic attractive substance. Should link 4 be of a material which is not attracted appreciably by a magnet, then an iron or steel rivet or magnet 8 can be mounted through said link. Link 4 if resilient can normally have a configuration as shown in FIG. 4.

A magnet 9 is partially embedded in body 1 as for example as an insert during the formation of said body and has one end positioned facing link 4, or when used, rivet or magnet 8 should be of opposite polarity. A cap 10 of an electrical insulating material which is preferably heat resistant such as asbestos filled material is mounted upon the free end of magnet 9 between the same and link 4 or rivet 8. Said magnet 9 is shown as a plug type magnet but it is to be appreciated that it can be of other configurations as well. Also said magnet 9 can be of any conventional construction such as permanent magnets of various types either of a metal or ceramic composition but a ceramic magnet such as for example Stackpole Ceramagnet is particularly well suited for the present purpose as they are non-conductors of electrical current.

A semi-circular eye 11 is partially embedded in body 1 for example as an insert during the production thereof and a coil spring 12 is connected to said eye and to and through the free end 13 of link 4 tending to pull said link end 13 from magnet 9 and also from a second link 14 fixedly attached to rivet 3 as an integral part thereof or by soldering, riveting or the like. Preferable links 4 and 13 are of the same material. Magnet 9 has a higher holding power than the retractive force of spring 12 so that link 4 is normally held by said magnet against link 14.

Links 4 and 13 can be of the same width and thickness along their entire lengths or that may have a portion 13a of reduced width as shown in FIG. 5 adjacent end 13 when said links are formed of a fusible material for example zinc or other relatively low melting point metal for fusing should the current passing therethrough be increased to a point for heating said links reduced portion above their melting point before link 4 separates from link 14.

The plug type circuit breaker shown in FIG. 7 is similar to that of FIG. 3, but has a plastic disc 15 in place of disc 6 and a rod 17 with knob 16 at one end and a recess 18 at its opposite end which rod is slideable through disc 15. A portion of link 4 is seated in said recess 18 and by lifting knob 16 said link will be moved towards magnet 9.

The circuit breaker of FIG. 9 is also similar to that of FIG. 3, but in addition has a plastic transparent cap 19 and insulating disc 20 mounted upon the open end of body 1 and retained thereto by pins 21 with a suitable adhesive within cover 19. Said cover has an inner cavity 19a in which is seated a low voltage incandescent or neon filled lamp 22 which has a pair of electrodes 21 therein and a pair of lead wires 24 and 26 each connected to one of said electrodes. Wire 24 has a leak resistor 25 interconnected therein and an end fixedly attached to link 4 by soldering or the like. Wire 26 is connected to pin 3 by soldering or the like.

The circuit breaker of FIG. 10 is similar to that of FIG. 3 except that link 4 extends from screw shell 2 over magnet 9 down to pin 3, with spring 12 connected to said link 4 by extending therethrough and to the upper end of housing 1 on an upward slant and a disc 15 is mounted in the open end of housing 1 closing the same and is retained thereon by a ferrule 6a spun in place and knob 16a has a rod 17a slideably extending through disc 15 and contacting link 4.

Thus in the operation of this circuit breaker of FIG. 10 when link 4 becomes heated and loses its attraction for magnet 9, spring 12 pulls link 4 upwardly from link 14 pushing rod 17a upwardly of disc 15. Thus knob 16a is raised indicating that the circuit breaker is in its circuit breaking condition. When the overload in the electical circuit which has heated link 4 is discontinued knob 16a can be manually pushed towards disc 15 and thus rod 17a will push link 4 towards magnet 9 and link 14 resetting the circuit breaker to its circuit closing condition.

FIG. 11 shows the present circuit breaker mounted within the body of a knife-blade or ferrule type cartridge fuse body having a tubular center section 27 of insulating material and metallic ferrules 28 and 29 spun onto each end of said center section and preferably of a brass or copper material and knife blades 36 and 37 may extend from said metallic ferrules 28 and 29 respectively.

A link 30 is attached to ferrule 28 and/or knife blade 36 by soldering and may be of the same material as link 4 with or without rivet 8 or reduced portion 14 depending upon the material used. That is, link 30 may have a rivet 32 similar to rivet 8 extending therethrough. A coil spring 33 is positioned between insulating tube 27 and link 30 tending to push said link 30 from magnet 34. Said magnet is mounted upon the tubular body 27 by a ring 35 of a material similar to tube 27 and fastened thereto by a suitable adhesive.

A second link 31 preferably of a material similar to link 30 is fixedly attached by soldering or the like to ferrule 29 and/or knife blade 27. Said links 30 and 31 are positioned for being in contact when link 30 is drawn to magnet 34 as magnet 34 has a stronger holding power than the pushing power of spring 33.

It is to be appreciated that springs 12 and 33 are not required when links 4 and 30 respectively are of a resilient material normally tending to move said links from their respective magnets 9 and 34. Also spring 33 can be connected to the opposite side of link 30 and tube 27 tending to pull said link from magnet 34.

Also magnets 9 and 34 can be carried by links 4 and 30 respectively in place of rivets 8 and 32 and magnetic material positioned in place of said magnets 9 and 34 on body 1 and tube 27 respectively. Links 4 and 30 as well as body 1 can both carry magnets at the same time. In the latter cases, the magnet should be of a material not effected by current or heat such as a ceramic magnet for example.

In the use of the present circuit breakers of FIGS. 1–9 inclusive the same is interconnected in an electrical circuit by screwing screw shell 2 into a conventional threaded socket (not shown) for receiving the same until rivet 3 engages the base terminal of the socket whereby screw shell 2 and rivet 3 provide terminals connected to the electrical circuit. Normally magnet 9 attracts link end 13 to link 14 so that the current passes from screw shell 2 through links 4 and 14 and rivet 3 closing the electrical circuit. However, should an overload occur in the electrical circuit greatly increasing the current passing link 4, said link and rivet 8, when used, will be heated suddenly and to a relative high temperature with the result that link 4 or rivet 8 has the magnetic permeability thereof diminished as its temperature rises. Thus, link 4 or rivet 8 will gradually lose its attraction for magnet 9 until the pulling power of spring 13 or the resiliency of link 4 becomes greater than the holding power of magnet 9. At a given point link 4 as shown in FIG. 4 will move from magnet 9 breaking contact with link 14 and thus interrupting the electrical circuit until such time as the overload is discontinued. When link 4 cools it or rivet 8 will again be attracted by magnet 9 moving towards and contacting link 14 against closing the electrical circuit.

Should the attraction of magnet 9 not be strong enough to move link 4, rod 17 of FIG. 7 can be raised pulling link 4 towards magnet 9, or rod 17a of FIG. 10 pushed in for the same purpose.

The circuit breaker of FIG. 11 is mounted with ferrules 28 and 29 or knife blades 36 and 37 inserted between a pair of clips of conventional type (not shown) interconnected in an electrical circuit whereby current passes from link 30 to link 31. Again should an overload such as a short circuit occur in the electrical circuit link 30 or rivet 32 will lose its attraction for magnet 34 and link 30 will move from link 31 due to its own normal resiliency or by spring 33, when used, thus breaking the electrical circuit until the overload is removed. When link 30 or rivet 32 cools it will again be attracted by magnet 34 into engaging with link 31 again restoring the electrical circuit to its closed condition.

While the present circuit breakers are shown and described as mounted in plug and cartridge type housings, it is to be appreciated they can equally as well be incorporated in other type and shape housings having terminals as desired.

The present invention is capable of considerably modifications, and such changes thereto as come within the scope of the appended claims is deemed to be a part thereof.

I claim:

1. An electrical circuit breaker comprising a plug type housing of electrical insulating material having an interior cavity, a screw shell conductor mounted on the exterior of said housing, a pin extending through said housing, a link extending within said housing cavity and having one end fixedly attached to said pin, a second link extending through said housing into said housing cavity, one end of said second link being fixedly attached to said screw shell conductor, another end of said second link extending along one side of said first link within said housing cavity, a magnet fixedly attached to said housing within said housing cavity and positioned for and capable of magnetically attracting said second link other end positioning said second link other end in contact with said first link one side until an electrical overload occurs in the electrical circuit which heats said second link until said second link gradually loses its attraction to said magnet and separates from said first link breaking the electrical circuit connected to said screw shell conductor and said pin wherein said pin extends through the bottom of said housing, said first link extends lengthwise of said housing cavity, said second link extends from said housing upper portion within said housing cavity lengthwise thereof towards said housing bottom and said magnet is mounted on the side housing on the other side of said first link.

2. An electrical circuit breaker as claimed in claim 1, wherein said second link is of a resilient material and shaped for normally being positioned out of contact with said first link.

3. An electrical circuit breaker as claimed in claim 1 including resilient means tending to move said second link out of contact with said first link.

4. An electrical circuit breaker as claimed in claim 1 including a spring connected to said housing within said housing cavity and to said second link tending to move said second link from contact with said first link.

5. An electrical circuit breaker as claimed in claim 1 including a spring connected to said housing within said housing cavity and to said second link tending to pull said second link from contact with said first link.

6. An electrical circuit breaker as claimed in claim 1 including a low voltage lamp having a pair of terminal wires, one of said wires being connected to said screw shell conductor, a resistor interconnected in the other of said wires and the other of said wires being connected to said second link whereby said lamp will light when said links are out of contact to indicate that condition when said screw shell conductor and said pin are connected in an electrical circuit.

References Cited

UNITED STATES PATENTS

| | | | |
|---|---|---|---|
| 2,205,944 | 6/1940 | Dunmire | 335—208 X |
| 2,718,569 | 9/1955 | Johnston | 335—208 |
| 3,057,978 | 10/1962 | Huetten | 335—146 X |
| 3,139,499 | 6/1964 | Cosgrove | 337—242 X |
| 3,170,999 | 2/1965 | Brown | 335—205 X |
| 3,290,630 | 12/1966 | Dyksterhouse et al. | 335—146 |
| 2,794,100 | 5/1957 | Fritz-Henning Baadev et al. | 335—146 X |
| 2,926,227 | 2/1960 | Sundt | 335—146 X |
| 3,246,105 | 4/1966 | Urani | 200—131 X |
| 3,270,164 | 8/1966 | Schubring. | |

BERNARD A. GILHEANY, Primary Examiner

R. N. ENVALL, JR., Assistant Examiner

U.S. Cl. X.R.

335—17